(12) United States Patent
Kim et al.

(10) Patent No.: US 9,812,121 B2
(45) Date of Patent: Nov. 7, 2017

(54) METHOD OF CONVERTING A TEXT TO A VOICE AND OUTPUTTING VIA A COMMUNICATIONS TERMINAL

(71) Applicant: LG CHEM, LTD., Seoul (KR)

(72) Inventors: Dong-Myung Kim, Daejeon (KR); Young-Soo Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/913,882

(22) PCT Filed: Aug. 5, 2015

(86) PCT No.: PCT/KR2015/008210
§ 371 (c)(1),
(2) Date: Feb. 23, 2016

(87) PCT Pub. No.: WO2016/021937
PCT Pub. Date: Feb. 11, 2016

(65) Prior Publication Data
US 2016/0210960 A1    Jul. 21, 2016

(30) Foreign Application Priority Data

Aug. 6, 2014  (KR) .................. 10-2014-0101232
Aug. 4, 2015  (KR) .................. 10-2015-0110072

(51) Int. Cl.
*G10L 13/00* (2006.01)
*G10L 13/02* (2013.01)
(Continued)

(52) U.S. Cl.
CPC ...... *G10L 13/043* (2013.01); *G06F 17/30743* (2013.01); *G10L 13/08* (2013.01);
(Continued)

(58) Field of Classification Search
CPC ... G10L 13/00; G10L 13/043; H04M 1/72552
See application file for complete search history.

(56) References Cited

U.S. PATENT DOCUMENTS 7,043,436 B1 *  5/2006  Ryu ........................ G10L 13/00
                                                    704/258
7,706,510 B2 *  4/2010  Ng ...................... H04M 1/72552
                                                    379/88.14
(Continued)

FOREIGN PATENT DOCUMENTS

CN    102655544 A    9/2012
CN    102740244 A    10/2012
(Continued)

OTHER PUBLICATIONS

International Search Report, issued in PCT/KR2015/008210, dated Dec. 4, 2015.

*Primary Examiner* — Jialong He
(74) *Attorney, Agent, or Firm* — Birch, Stewart, Kolasch & Birch, LLP

(57) ABSTRACT

A method and system for outputting a text content of text data to a voice, including using a transmitting terminal of a sender to transmit text data to a receiving terminal via a communications network, converting text content of the text data to speech and outputting the speech in the sender's voice characteristics using a voice database.

32 Claims, 5 Drawing Sheets

(51) Int. Cl.
*G10L 13/04* (2013.01)
*H04W 4/18* (2009.01)
*G06F 17/30* (2006.01)
*G10L 13/08* (2013.01)
*H04W 4/12* (2009.01)
*H04L 29/08* (2006.01)
*H04M 1/725* (2006.01)

(52) U.S. Cl.
CPC ........ *H04L 67/04* (2013.01); *H04M 1/72594* (2013.01); *H04W 4/12* (2013.01); *H04W 4/18* (2013.01); *H04M 1/72552* (2013.01)

(56) References Cited

U.S. PATENT DOCUMENTS

| | | | |
|---|---|---|---|
| 2002/0013708 A1* | 1/2002 | Walker | G10L 13/04 704/260 |
| 2003/0120489 A1 | 6/2003 | Krasnansky et al. | |
| 2004/0267531 A1* | 12/2004 | Whynot | H04L 12/581 704/260 |
| 2005/0256716 A1* | 11/2005 | Bangalore | G10L 13/06 704/260 |
| 2006/0229876 A1* | 10/2006 | Aaron | G10L 13/07 704/263 |
| 2007/0078656 A1* | 4/2007 | Niemeyer | G10L 13/02 704/260 |
| 2008/0065383 A1* | 3/2008 | Schroeter | G10L 13/06 704/260 |
| 2008/0235024 A1* | 9/2008 | Goldberg | G10L 13/033 704/260 |
| 2008/0268817 A1 | 10/2008 | Anderl et al. | |
| 2009/0024393 A1* | 1/2009 | Kaneyasu | G10L 13/033 704/260 |
| 2009/0037536 A1* | 2/2009 | Braam | G06Q 10/107 709/206 |
| 2009/0299746 A1 | 12/2009 | Meng et al. | |
| 2009/0313022 A1* | 12/2009 | Hsiao | H04W 4/18 704/260 |
| 2011/0165912 A1* | 7/2011 | Wang | G10L 13/033 455/563 |
| 2013/0191130 A1 | 7/2013 | Chen et al. | |

FOREIGN PATENT DOCUMENTS

| | | |
|---|---|---|
| CN | 103281683 A | 9/2013 |
| EP | 2 205 010 A1 | 7/2010 |
| KR | 10-2001-0035173 A | 5/2001 |
| KR | 10-2002-0091920 A | 12/2002 |
| KR | 10-2006-0061612 A | 6/2006 |
| KR | 10-2007-0010360 A | 1/2007 |
| KR | 10-2007-0049730 A | 5/2007 |
| KR | 10-2011-0051580 A | 5/2011 |
| TW | 201034002 A1 | 9/2010 |
| TW | 201331930 A1 | 8/2013 |
| WO | WO 2008/132758 A2 | 11/2008 |

* cited by examiner

METHOD OF CONVERTING A TEXT TO A VOICE AND OUTPUTTING VIA A COMMUNICATIONS TERMINAL

TECHNICAL FIELD

The present disclosure relates to text data output technology, and more particularly, to a method of outputting a text content of text data received on a terminal to a sender's voice.

The present application claims priority to Korean Patent Application No. 10-2014-0101232 filed on Aug. 6, 2014 and Korean Patent Application No. 10-2015-0110072 filed on Aug. 4, 2015, the disclosures of which are expressly incorporated herein by reference in their entireties.

BACKGROUND ART

Recently, with the development of mobile communication technology, not only voice calls but also text messages are being widely used. The voice calls and transmission and reception of text messages are made through mobile communication terminals, such as, including mobile phones and smartphones.

The text messages are generally outputted in visually recognizable text. That is, a terminal which received a text message outputs the text message only in text format. When text messages are only outputted in text format, visually impaired persons cannot read the content of the text messages, and even persons whose vision is not impaired often cannot read the content of the text messages while they are doing activities, for example, working, exercising, and driving. Further, messages in text format have limitation in conveying emotions or friendliness due to their inability. Recently, with the widespread use and the growing range of applications of mobile communication terminals, there is the demand for technology that stimulates emotions of terminal users using mobile communication terminals.

DISCLOSURE

Technical Problem

The present disclosure is designed to solve the problem of the related art, and therefore, the present disclosure is intended to output the text content of text data to a sender's voice.

The present disclosure is further intended to continuously update voice information of a text message sender using a voice signal transmitted and received during a voice call with the text message sender, to allow a voice more similar to a real voice of the sender to be outputted with the increasing number of calls.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To achieve the object, a method of outputting a text to a voice according to an aspect of the present disclosure whereby a voice is outputted through a communication terminal, includes transmitting, by a transmitting terminal, text data to a receiving terminal, and outputting, by the receiving terminal, text content of the text data transmitted from the transmitting terminal to a voice of a sender of the text data.

Before the receiving the text data, the method may further include constructing a voice database for voice data of the sender of the text data.

The constructing a voice database may include storing voice data of the sender of the text data and text data corresponding to the voice data in matched form.

The constructing a voice database may include storing voice data of the sender of the text data and text data corresponding to the voice data for each sentence, each word, and each syllable.

The constructing a voice database may include constructing a voice database for voice data of the sender of the text data using voice data transmitted and received during a voice call using the transmitting terminal and the receiving terminal.

The constructing a voice database may include constructing a voice database with the repetition of voice calls between the transmitting terminal and the receiving terminal. The constructing a voice database may include further storing text data absent in an already constructed voice database among text data corresponding to voice data constituting a voice call between the transmitting terminal and the receiving terminal in matched form with voice data corresponding to the text data absent in the voice database, for each sentence, each word, and each syllable.

The constructing a voice database may include updating and storing text data present in an already constructed voice database among text data corresponding to voice data constituting a voice call between the transmitting terminal and the receiving terminal, in matched form with voice data corresponding to text data absent in the voice database, for each sentence, each word, and each syllable.

After the constructing a voice database, the method of outputting a text to a voice may further include quantitating a construction degree of the voice database constructed through the voice call between the transmitting terminal and the receiving terminal.

After the quantitating, the method may further include grading the construction degree of the voice database by a predetermined grade based on a value quantitated in the quantitating.

After the grading, the method may further include outputting, by the receiving terminal, the grade graded in the grading through a display.

The outputting the graded grade may include outputting different visual information based on the predetermined grade.

The quantitating may include quantitating a construction degree of the voice database for each text data sender by summing up a number of sentences, a number of words, and a number of syllables in the voice data and the text data stored in the voice database for each sentence, each word, and each syllable.

The quantitating may include quantitating a construction degree of the voice database for each text data sender by providing each weight to a number of sentences, a number of words, and a number of syllables in the voice data and the text data stored in the voice database for each sentence, each word, and each syllable, and summing up the weighted number of sentences, the weighted number of words, and the weighted number of syllables.

The weight provided to the number of sentences may be higher than or equal to the weight provided to the number of words, and the weight provided to the number of words may be higher than or equal to the weight provided to the number of syllables.

Before the outputting to a voice, the method may further include conducting a search to determine whether information that matches information associated with the sender of the text data is present in the voice database, extracting, from the voice database, voice data corresponding to the text data transmitted from the transmitting terminal based on a search result in the conducting a search, and transmitting the voice data extracted in the extracting to the receiving terminal.

As a search result in the conducting a search, when information that matches information associated with the sender of the text data is present in the voice database, the extracting voice data may include extracting voice data of the sender of the text data stored in the voice database.

As a search result in the conducting a search, when information that matches information associated with the sender of the text data is absent in the voice database, the extracting voice data may include extracting a robot voice stored in the voice database.

Before the outputting to a voice, the method may further include conducting a search to determine whether information that matches information associated with the sender of the text data is present in the voice database, extracting, from the voice database, voice data corresponding to the text data transmitted from the transmitting terminal based on a search result of the conducting a search, and transmitting the voice data extracted in the extracting to the receiving terminal, wherein the extracting voice data includes extracting, from the voice database, voice data that matches a sentence corresponding to a sentence included in the text data transmitted from the transmitting terminal, extracting, from the voice database, voice data that matches a word corresponding to a word included in the text data transmitted from the transmitting terminal, and extracting, from the voice database, voice data that matches a syllable corresponding to a syllable included in the text data transmitted from the transmitting terminal.

The extracting a word may be performed after the extracting a sentence, and when extracting voice data for a predetermined sentence is successively performed in the extracting a sentence, extracting a word for the predetermined sentence may be not performed, and the extracting a syllable may be performed after the extracting a word, and when extracting voice data for a predetermined word is successively performed in the extracting a word, extracting a syllable for the predetermined word may be not performed. The extracting a sentence, the extracting a word, and the extracting a syllable may be iteratively performed on at least two sentences included in the text data transmitted from the transmitting terminal.

To achieve the object, a system for outputting a text to a voice according to another aspect of the present disclosure includes a communication network, a transmitting terminal to transmit text data to a receiving terminal via the communication network, and a receiving terminal to output voice data of a sender of the text data who transmitted the text data, the voice data corresponding to the text data transmitted from the transmitting terminal via the communication network.

The communication network may be provided with a voice server which constructs a voice database for voice data of the sender of the text data.

The voice server may match voice data of the sender of the text data to text data corresponding to the voice data, and store the same in the voice database.

The voice server may store voice data of the sender of the text data and text data corresponding to the voice data for each sentence, each word, and each syllable.

The voice server may construct a voice database for voice data of the sender of the text data using voice data transmitted and received during a voice call using the transmitting terminal and the receiving terminal.

The voice server may construct the voice database with the repetition of voice calls between the transmitting terminal and the receiving terminal.

The voice server may further store text data absent in an already constructed voice database among text data corresponding to voice data constituting a voice call between the transmitting terminal and the receiving terminal, in matched form with voice data corresponding to the text data absent in the voice database, for each sentence, each word, and each syllable.

The voice server may update and store text data present in an already constructed voice database among text data corresponding to voice data constituting a voice call between the transmitting terminal and the receiving terminal, in matched form with voice data corresponding to text data absent in the voice database, for each sentence, each word, and each syllable.

The voice server may quantitate a construction degree of the voice database constructed through the voice call between the transmitting terminal and the receiving terminal.

The voice server may grade the construction degree of the voice database into a predetermined grade based on the quantitated value.

The receiving terminal may output the grade graded into the predetermined grade through a display.

The receiving terminal may output different visual information based on the predetermined grade.

The voice server may quantitate a construction degree of the voice database for each text data sender by summing up a number of sentences, a number of words, and a number of syllables of the voice data and the text data stored in the voice database for each sentence, each word, and each syllable.

The voice server may quantitate a construction degree of the voice database for each text data sender by providing each weight to a number of sentences, a number of words, and a number of syllables in the voice data and the text data stored in the voice database for each sentence, each word, and each syllable, and summing up the weighted number of sentences, the weighted number of words, and the weighted number of syllables.

The weight provided to the number of sentences may be higher than or equal to the weight provided to the number of words, and the weight provided to the number of words may be higher than or equal to the weight provided to the number of syllables.

The voice server may receive the text data transmitted from the transmitting terminal, may conduct a search to determine whether information that matches information associated with the sender of the text data is present in the voice database, may extract, from the voice database, voice data corresponding to the text data transmitted from the transmitting terminal based on a result of the conducting a search, and may transmit the extracted voice data to the receiving terminal.

As a result of the conducting a search, when information that matches information associated with the sender of the text data is present in the voice database, the voice server may extract voice data of the sender of the text data stored in the voice database.

As a result of the conducting a search, when information that matches information associated with the sender of the text data is absent in the voice database, the voice server may extract a robot voice stored in the voice database.

The voice server may receive the text data transmitted from the transmitting terminal, may conduct a search to determine whether information that matches information associated with the sender of the text data is present in the voice database, may extract, from voice database, voice data corresponding to the text data transmitted from the transmitting terminal based on a result of the conducting a search, and may transmit the extracted voice data to the receiving terminal, and in the extracting, from the voice database, voice data corresponding to the text data transmitted from the transmitting terminal based on a result of the conducting a search, the voice server may conduct a search for a text content included in the text data transmitted from the transmitting terminal in the voice database, and may extract at least one of voice data that matches a sentence corresponding to a sentence included in the text data transmitted from the transmitting terminal, voice data that matches a word corresponding to a word included in the text data transmitted from the transmitting terminal, and voice data that matches a syllable corresponding to a syllable included in the text data transmitted from the transmitting terminal.

When voice data that matches a sentence corresponding to a predetermined sentence included in the text data transmitted from the transmitting terminal is present in the voice database, the voice server may extract only voice data that matches the sentence corresponding to the predetermined sentence, and when voice data that matches a word corresponding to a predetermined word included in the text data transmitted from the transmitting terminal is present in the voice database, the voice server may extract only voice data that matches the word corresponding to the predetermined word.

The voice server may perform voice data extraction on at least two sentences included in the text data transmitted from the transmitting terminal.

Advantageous Effects

According to the present disclosure, when a transmitting terminal transmits text data, a receiving terminal can output the content of the text data transmitted from the transmitting terminal not only in text but also to a voice. Particularly, according to the present disclosure, the content of the text data can be outputted to a sender's voice.

According to an aspect of the present disclosure, a caller's voice is stored in organized form based on voice data transmitted and received during a voice call using a communication terminal, so with the increasing number of calls, a voice more similar to a real voice of a text message sender is outputted.

According to another aspect of the present disclosure, not only a text message transmitted from a sender but also a text signal which can be outputted using a terminal is outputted to a sender's voice.

BRIEF DESCRIPTION OF THE DRAWINGS

The accompanying drawings illustrate a preferred embodiment of the present disclosure, and together with the foregoing disclosure, serve to provide further understanding of the technical aspect of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Also, in the description of the present disclosure, when it is deemed that certain detailed description of related well-known features or functions may obscure the essence of the disclosure, its detailed description is omitted herein.

Figure 1:
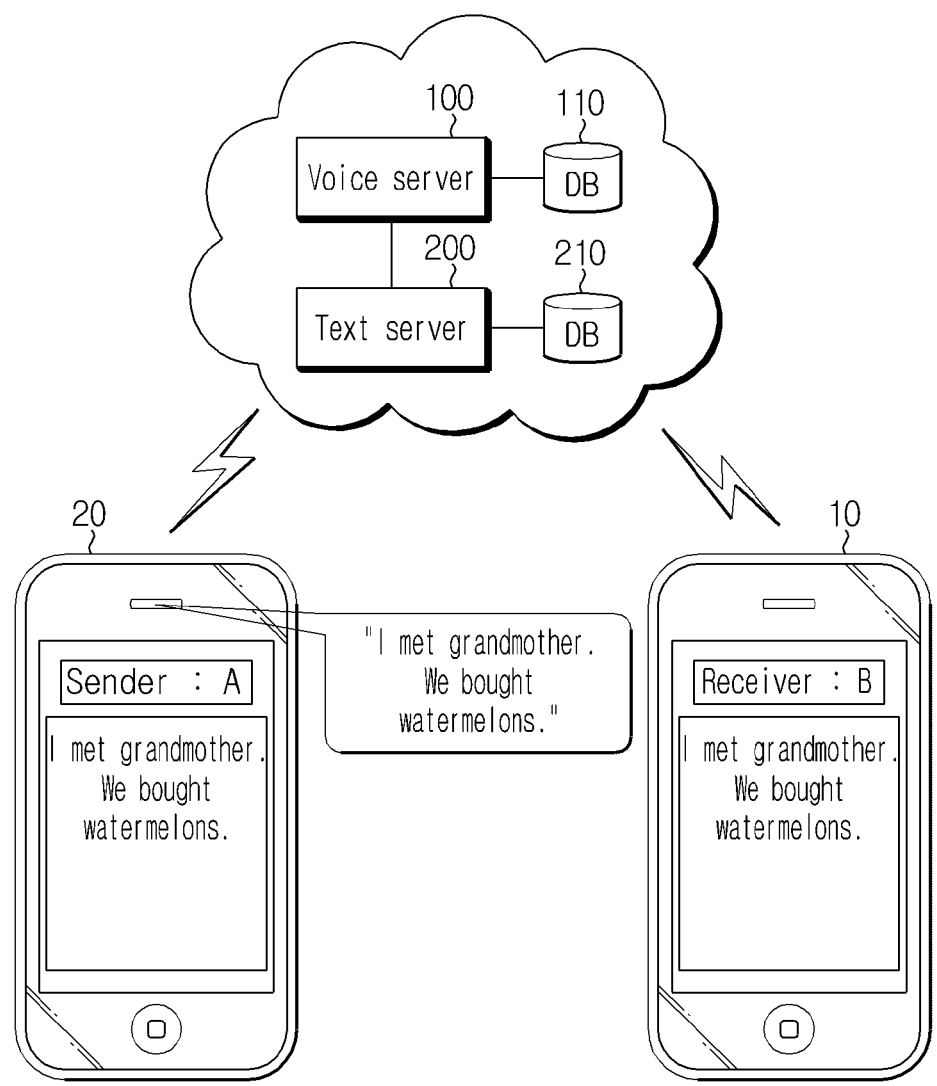
FIG. 1 is a diagram showing a system for outputting a text to a voice according to an embodiment of the present disclosure.

FIG. 1 is a diagram showing a system for outputting a text to a voice according to an embodiment of the present disclosure.

Referring to FIG. 1, the system for outputting a text to a voice according to an embodiment of the present disclosure includes a transmitting terminal 10, a receiving terminal 20, and a mobile communication network 30.

The transmitting terminal 10 and the receiving terminal 20 is a communication terminal capable of transmitting and receiving text data and making a voice call. For example, the communication terminal may be a smartphone or a tablet PC. Although the transmitting terminal 10 and the receiving terminal 20 are shown as a smartphone, a smartphone is provided by way of illustration only, the transmitting terminal 10 and the receiving terminal 20 of the present disclosure are not limited to a smartphone.

The text data transmitted from the transmitting terminal 10 is data that can be displayed in text through a display of the receiving terminal 20. More specifically, the text data transmitted from the transmitting terminal 10 is data that is modulated in the transmitting terminal 10 and transmitted to the receiving terminal 20, and after being transmitted to the receiving terminal 20, the data is demodulated in the receiving terminal 20 and displayed in text on a display. For instance, the text data may be a collection of bits.

According to an embodiment, when a user of the transmitting terminal 10, i.e., a sender inputs a text into the transmitting terminal 10 and transmits the same, the text is modulated into text data and transmitted to the receiving terminal 20 via the mobile communication network 30.

The receiving terminal 20 may demodulate the received text data into a visually recognizable text and display the same. In addition to the received text data, the receiving terminal 20 may output a variety of visual information through the display.

The receiving terminal 20 according to an embodiment of the present disclosure may output the content of the text data transmitted from the transmitting terminal 10 not only in text but also to a voice.

More specifically, the receiving terminal 20 may output the text content of the text data to a sender's voice. That is, the receiving terminal 20 may output the text content of the text data to a voice of the user of the transmitting terminal 10.

The receiving terminal 20 may have a speaker to produce a voice output. To output the text content of the text data transmitted from the transmitting terminal 10 to a voice, the receiving terminal 20 may receive voice data corresponding to the text data from an external device. The receiving terminal 20 may output the voice data received from the external device through the speaker. The voice data is data that is demodulated in the receiving terminal 20 and outputted through the speaker, and may be a collection of bits.

The receiving terminal 20 may demodulate text data transmitted from the mobile communication network 30 and output the text content through the display, and may demodulate voice data transmitted from the mobile communication network 30 and output a voice signal through the speaker.

The mobile communication network 30 may be provided with a text server 200 and a voice server 100. The mobile communication network 30 may transmit and receive text data and voice data using the text server 200 and the voice server 100.

The text server 200 may receive text data from the transmitting terminal 10, and transmit the text data to the receiving terminal 20. The text server 200 may be provided with a text database 210 to store the text data received from the transmitting terminal 10.

The voice server 100 includes a voice database 110 in which text data and voice data corresponding to the text data is stored in matched form. The voice database 110 is where text data and voice data is stored in matched form for each talker.

According to an embodiment, the voice database 110 may further store text data and voice data in matched form for each sentence, each word, and/or each syllable. For example, the voice database 110 may store text data "I met grandmother. We bought watermelons" and voice data corresponding thereto in matched form. In this instance, the voice database 110 may store text data and voice data corresponding thereto in matched form for each of two sentences "I met grandmother" and "We bought watermelons", may store text data and voice data corresponding thereto in matched form for each word "I", "met", "grandmother", "we", "bought", and "watermelons", and may store text data and voice data corresponding thereto in matched form for each syllable "I", "met", "grand", "moth", "er", "we", "bought", "wa", "ter", "mel", and "ons". Such information may be stored in the voice database 110 for each talker.

Figure 2:
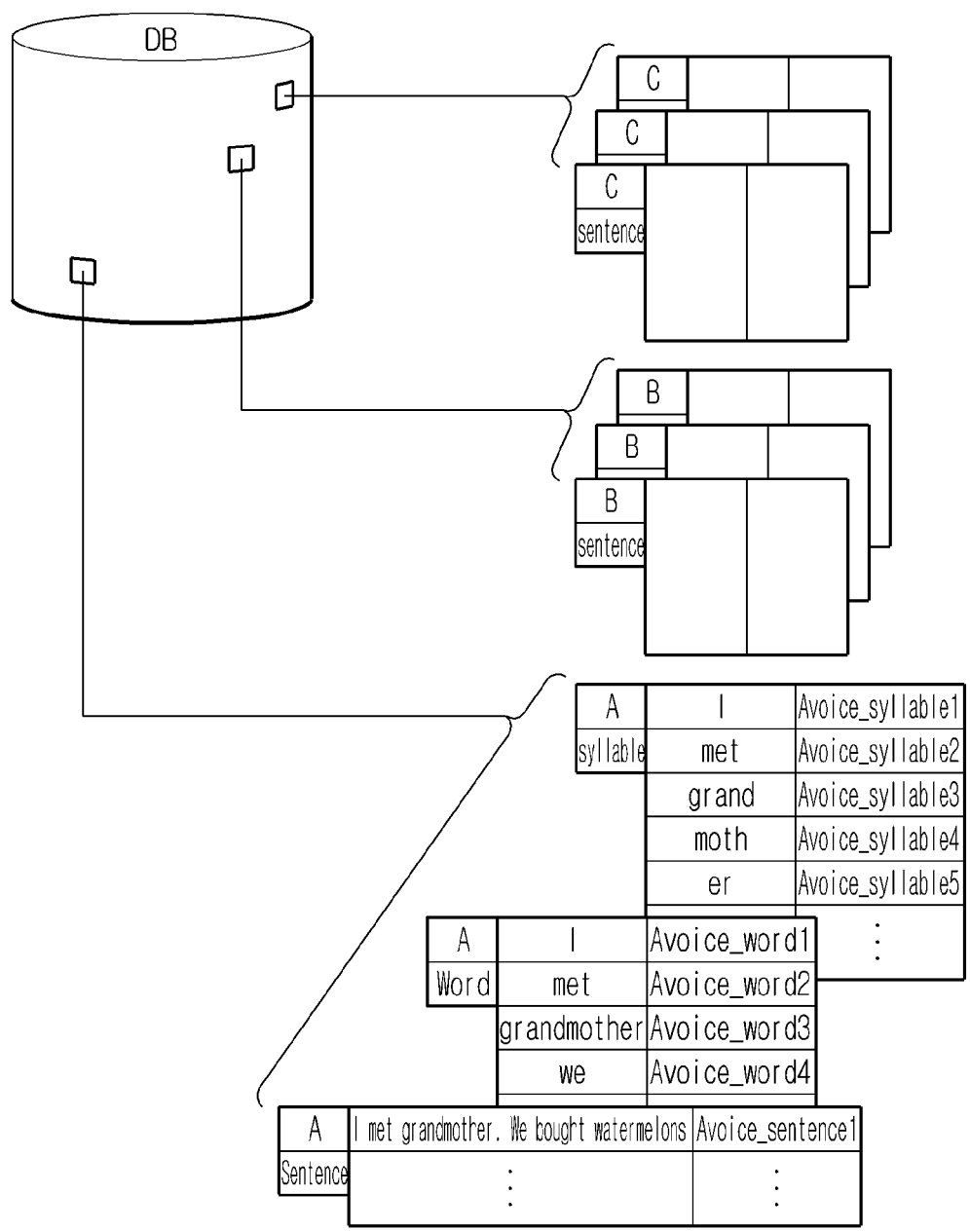
FIG. 2 is a diagram schematically showing a voice database according to an embodiment of the present disclosure.

FIG. 2 is a diagram schematically showing the voice database 110 according to an embodiment of the present disclosure.

Referring to FIG. 2, the voice database 110 according to an embodiment of the present disclosure stores text data and voice data in matched form for each talker. That is, the voice database 110 according to an embodiment of the present disclosure stores text data and voice data in matched form, in which the text data and the voice data is classified by talker.

That is, the voice database 110 according to an embodiment of the present disclosure stores text data and voice data corresponding thereto not only by talker but also by sentence, by word, and by syllable for each talker.

According to an embodiment, the voice database 110 may be constructed from a call made between the transmitting terminal 10 and the receiving terminal 20. That is, the voice database 110 may be constructed using voice data extracted from a call made between the transmitting terminal 10 and the receiving terminal 20.

According to an embodiment, the voice server 100 may extract voice data constituting a call made between the transmitting terminal 10 and the receiving terminal 20. In this instance, the voice server 100 may extract voice data constituting a call in real time or after the call ends. The voice server 100 may store voice data constituting a call by sentence, by word, and by syllable for each talker. Also, the voice server 100 may extract text data corresponding to the voice data from the voice data. For example, as in the above example, the voice server 100 may extract text data from voice data "I met grandmother. We bought watermelons" presented by A during a call between A and B, for each sentence, each word, and each syllable. In this instance, text extraction from voice data may be performed through known voice recognition technology. According to an embodiment, text extraction from voice data may be performed on all syllables of the voice data through syllable-based voice recognition. When text data extraction is performed on all syllables, voice data-text data matching per syllable, voice data-text data per word, and voice data-text data matching per sentence follows, and through this, the voice database 110 may be constructed in which text data and voice data is stored in matched form for each syllable, each word, and each sentence.

Further, the voice server 100 may construct the voice database 110 each time a voice call between the transmitting terminal 10 and the receiving terminal 20 is repeated. That is, the voice server 100 may update the voice database 110 each time a voice call between the transmitting terminal 10 and the receiving terminal 20 is repeated. The voice server 100 conduct a search to determine whether voice data constituting a call is present in the already constructed voice database 110, and when voice data constituting a call is absent in the already constructed voice database 110, the voice server 100 may match the voice data with text data corresponding to the voice data and store the same. In this instance, the voice data may be stored in matched form with text data for each syllable, each word, and each sentence. When voice data constituting a call is present in the already constructed voice database 110, the voice server 100 may maintain the voice data present in the already constructed voice database 110, and may update the voice data present in the already constructed voice database 110 by using latest data. Preferably, the voice server 100 may update the voice database 110 by updating the already constructed voice database 110.

As the number of calls between the transmitting terminal 10 and the receiving terminal 20 increases, the voice database 110 is updated and voice information of a talker of the transmitting terminal 10 is gradually compensated for. That is, with the increasing number of calls between the transmitting terminal 10 and the receiving terminal 20, voice data may become more similar to a real voice of a texter. As an amount of voice data associated with syllables increases, more various texts may be represented with a voice, and as an amount of voice data associated with words or sentences increases, a voice more similar to a real voice may be outputted.

According to an embodiment, the voice server 100 may quantitate a construction degree of the voice database 110 constructed through a voice call between the transmitting terminal 10 and the receiving terminal 20. That is, the construction degree of the voice database 110 may be quantitatively evaluated based on a predetermined criterion. Here, the quantitatively evaluated value may be classified into a predetermined grade. That is, the voice server 100 may grade the construction degree of the voice database 110 into a predetermined grade based on the quantitated value of the construction degree of the voice database 110.

The value quantitated by the voice server 100 and/or the grade for the quantitated value may be stored in the voice database 110 or a separate storing medium, and may be transmitted to the receiving terminal 20. The receiving terminal 20 may receive the quantitated value and/or the grade for the quantitated value from the voice server 100, and output different visual information by predetermined grade. For example, assume the construction degree of the voice database 110 is classified into five grades, the receiving terminal 20 may output five stars (☆) for the first grade, four stars for the second grade, three stars for the third grade, two stars for the fourth grade, and one star for the fifth grade through the display. Here, the visual information marked with a star (☆) is for illustration purposes only, and the construction degree of the voice database 110 may be presented on the display through a variety of visual information.

A method of quantitatively evaluating the construction degree of the voice database 110 may be variously set. According to an embodiment, the voice server 100 may quantitate the construction degree of the voice database 110 for each texter by summing up the number of sentences, the number of words and the number of syllables stored in the voice database 110. For example, assume there are 1,000 sentences, 10,000 words, and 100,000 syllables in voice data and text data stored in the voice database 110 for each sentence, each word, and each syllable, the construction degree of the voice database may be quantitated as 111,000 (=1,000+10,000+100,000). According to another embodiment, the voice server 100 may quantitate the construction degree of the voice database 110 by providing each weight to the number of sentences, the number of words, and the number of syllables stored in the voice database 110, and summing up the weighted number of sentences, the weighted number of words, and the weighted number of syllables. As in the above example, assume there are 1,000 sentences, 10,000 words, and 100,000 syllables in voice data and text data stored in the voice database 110 for each sentence, each word, and each syllable, the weight a is provided to the number of sentences, the weight b is provided to the number of words, and the weight c is provided to the number of syllables. Thus, the construction degree of the voice database 110 is quantitated as 1,000*a+ 10,000*b+100,000*c. Preferably, the weights provided to each of the number of sentences, the number of words, and the number of syllables may be provided as below in consideration of the degree of completion of the sentence. That is, the weight provided to the number of sentences is preferably set to be higher than or equal to the weight provided to the number of words, and the weight provided to the number of words is preferably set to be higher than or equal to the weight provided to the number of syllables (that is, in this example, $a \geq b \geq c$).

Further, the voice server 100 may search for voice data corresponding to text data received from an external device in the voice database 110. In this instance, the voice server 100 may search for voice data corresponding to text data received from an external device for each talker. Also, the voice server 100 may extract voice data corresponding to text data from the voice database 110, and transmit the extracted voice data to the receiving terminal 20. For example, when a person A transmits text data to the receiving terminal 20 by using the transmitting terminal 10, the voice server 100 may search for information associated with the talker A in the voice database 110, extract voice data of the talker A, and transmit the A's extracted voice data to the receiving terminal 20.

Further, the voice server 100 may search for voice data corresponding to text data received from an external device for each sentence, each word, and each syllable. Preferably, the voice server 100 may search for text data in an order of sentences, words, and syllables.

Figure 3:
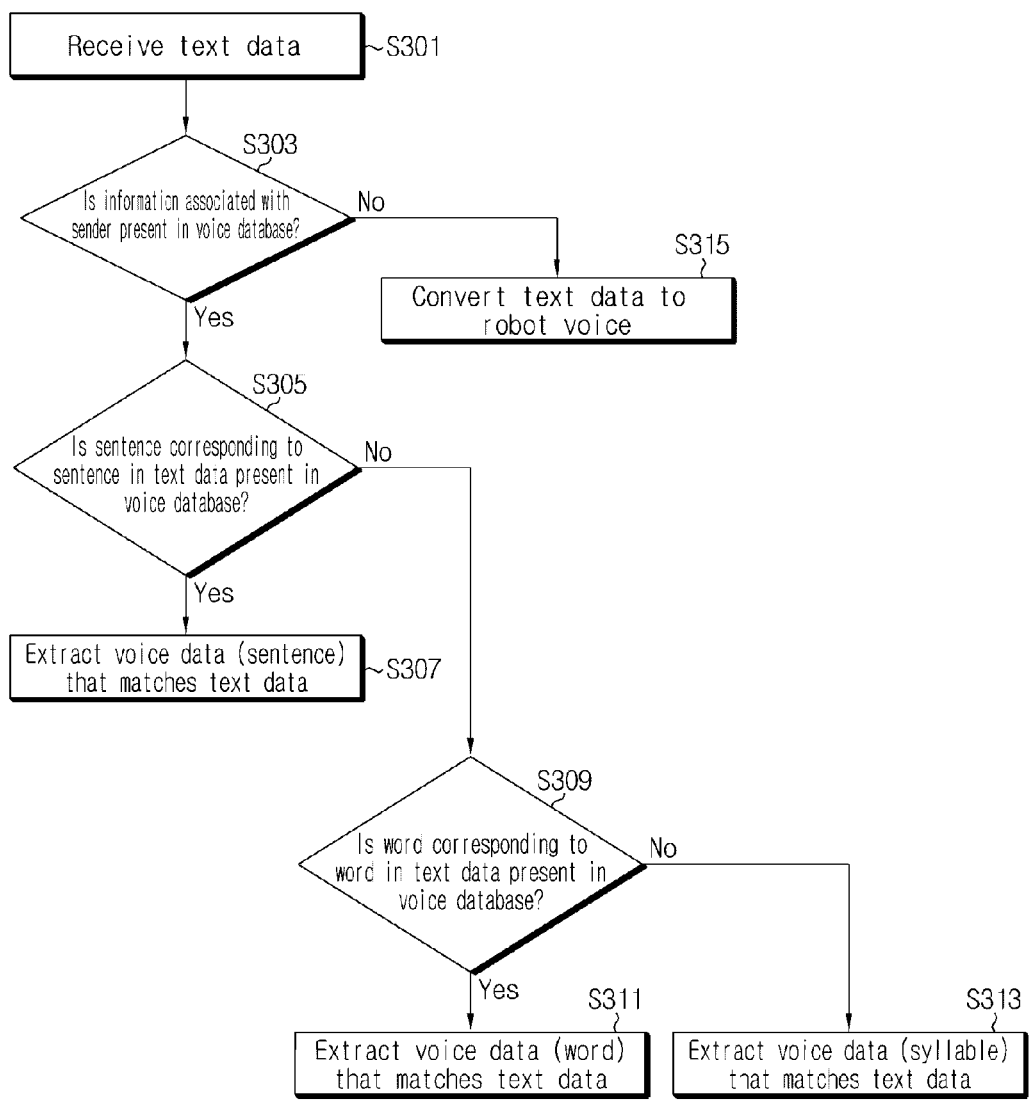
FIG. 3 is a flowchart showing a process of extracting voice data according to an embodiment of the present disclosure.

FIG. 3 is a flowchart showing a process of extracting voice data according to an embodiment of the present disclosure.

Referring to FIG. 3, the voice server 100 according to an embodiment of the present disclosure extracts voice data from the voice database 110 through the following process.

First, the voice server 100 receives text data from an external device (S301). For example, as shown in FIG. 1, the voice server 100 may receive text data from the text server 200. Subsequently, the voice server 100 conducts a search to determine whether information associated with a sender who transmitted the received text data is present in the voice database 110 (S303). As a result of conducting a search in the voice server 100, when information associated with the texter is stored in the voice database 110, a process of extracting the sender's voice data corresponding to the text data is performed, and if not so, a process of converting the text data into a robot voice is performed (S315).

More specifically, as a result of conducting a search in the voice server 100, when information associated with the texter is stored in the voice database 110, the voice server 100 conducts a search to determine whether a sentence corresponding to a sentence of the text data is present in the voice database 110 (S305). When a sentence corresponding to a sentence of the text data is present in the voice database 110, the voice server 100 extracts voice data (sentence) which matches the sentence of the text data from the voice database 110 (S307). In contrast, when a sentence corresponding to a sentence of the text data is absent in the voice database 110, the voice server 100 conducts a search to determine whether a word corresponding to a word of the text data is present in the voice database 110 (S309). When a word corresponding to a word of the text data is present in the voice database 110, the voice server 100 extracts voice data (word) which matches the word of the text data from the voice database 110 (S311). In contrast, when a word corresponding to a word of the text data is absent in the voice database 110, the voice server 100 extracts voice data (syllable) which matches a syllable of the text data (S313).

When information associated with the sender is present in the voice database 110, the voice server 100 iteratively performs the foregoing steps (S305~S313) for each sentence of the text data to extract voice data for all the text data. The voice server 100 transmits the extracted voice data to the receiving terminal 20 to allow the receiving terminal 20 to output the text to the sender's voice.

When voice data which matches a syllable of the text data is absent in the voice database 110, the voice server 100 may transmit a message notifying failed voice conversion due to insufficient voice information to the receiving terminal 20, or may convert the text data to a pre-stored robot voice and transmit the same to the receiving terminal 20. In converting the text data to a robot voice, the voice server 100 may convert only a syllable lacking voice information to a robot voice and may convert all the sentences to a robot voice, and for the insufficient syllable, may not perform voice conversion. In the same way as the voice data for each sender, the robot voice may be stored in the voice database 110, and voice data associated with a variety of known syllables, words, sentences may be stored in the voice database 110 in matched form with text data.

As a result of determining whether information associated with the sender is present in the voice database 110, when information associated with the sender is absent in the voice database 110, the text data may be converted to a pre-stored robot voice. The robot voice may be pre-stored in the voice database 110.

Figure 4:
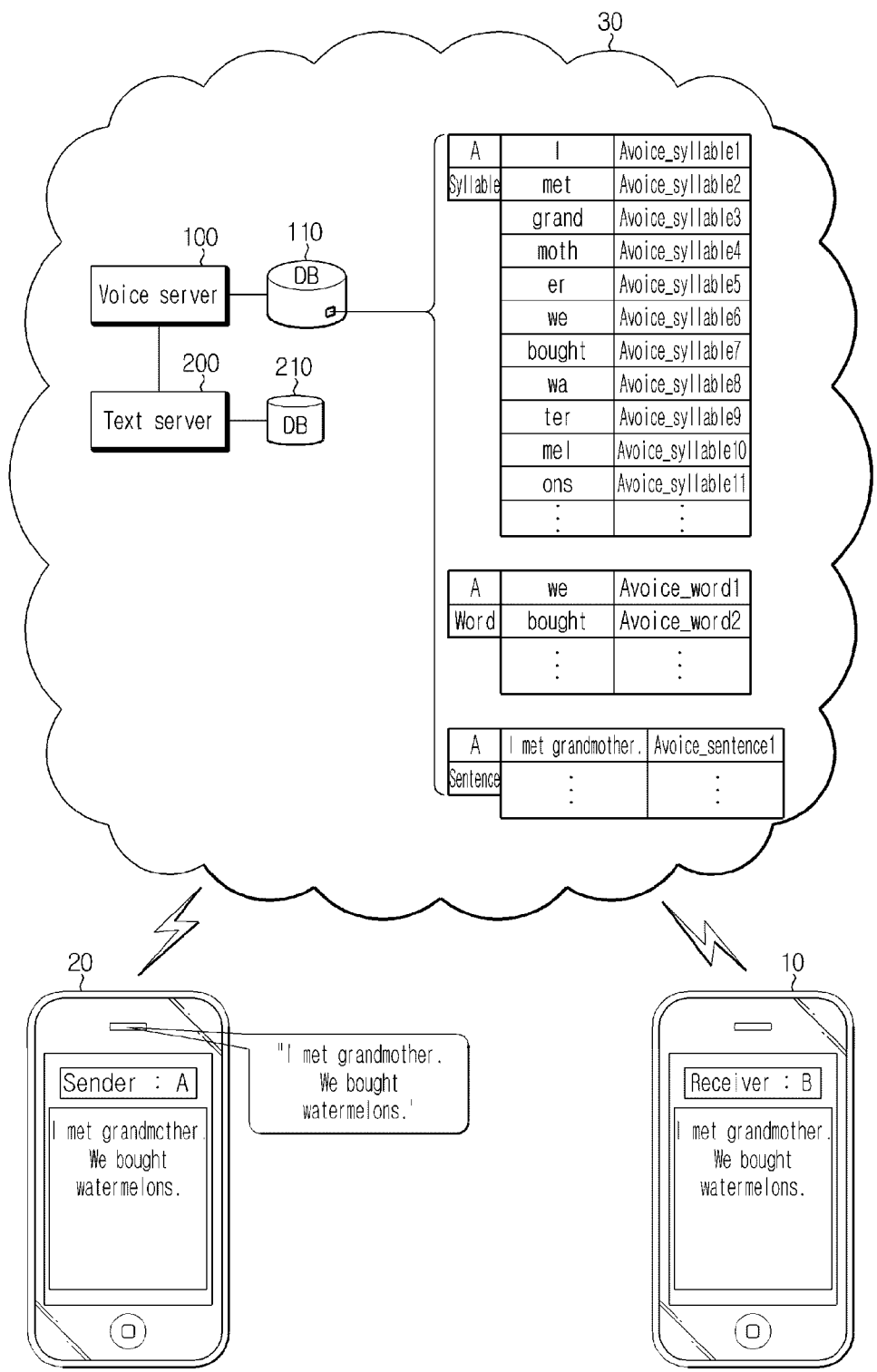
FIG. 4 is a diagram showing an example of a process whereby a receiving terminal outputs a sentence in a text message transmitted from a transmitting terminal to a voice by using a system for outputting a text to a voice according to an embodiment of the present disclosure.

FIG. 4 is a diagram showing an example of a process whereby the receiving terminal 20 outputs a sentence in the text message transmitted from the transmitting terminal 10 to a voice by using the system for outputting a text to a voice according to an embodiment of the present disclosure.

Referring to FIG. 4, the system for outputting a text to a voice according to an embodiment of the present disclosure includes the transmitting terminal 10, the receiving terminal 20, and the mobile communication network 30. The mobile communication network 30 includes the text server 200 and the voice server 100, and the voice server 100 is provided with the voice database 110. In the example of FIG. 4, the voice database 110 provided in the voice server 100 is constructed to store text data and voice data in matched form for each talker, as well as for each sentence, each word, and each syllable. Also, in the example of FIG. 4, the voice database 110 related to the talker A stores voice data which matches the sentence "I met grandmother", and voice data which matches each of the words "we" and "bought", and voice data which matches each of the syllables "I", "met", "grand", "moth", "er", "bought", "wa", "ter", "mel", and "ons" in matched form with each sentence, each word, and each syllable.

First, when the transmitting terminal 10 transmits the text message "I met grandmother. We bought watermelons" to the receiving terminal 20, the text data is transmitted to the text server 200 and the text server 200 transmits the received text data to the receiving terminal 20 and the voice server 100. The voice server 100 conducts a search to determine whether information associated with the sender A who transmitted the received text data is present in the database. As previously presented, because information associated with A is present in the database, the voice server 100 performs sentence matching. That is, the voice server 100 conducts a search to determine whether a sentence included in the received text data is present in the voice database 110.

As previously presented, because the first sentence "I met grandmother" is present in the voice database 110, the voice server 100 extracts voice data (Avoice_sentence1) which matches "I met grandmother". Subsequently, the voice server 100 conducts a search to determine whether the second sentence "we bought watermelons" is present in the voice database 110. As previously presented, because information corresponding to the sentence "we bought watermelons" is absent in the voice database 110, the voice server 100 performs word matching. That is, the voice server 100 conducts a search to determine whether a word included in the received text data is present in the voice database 110. As previously presented, the first word "we" and the second word "bought" in the second sentence "we bought watermelons" are present in the voice database 110, the voice server 100 extracts voice data (Avoice_word1) which matches "we" and voice data (Avoice_word2) which matches "bought". However, because voice data which matches "watermelons" is absent in the voice database 110, the voice server 100 performs syllable matching for the third word in the second sentence. That is, the voice server 100 extracts voice data Avoice_syllable8, Avoice_syllable9, Avoice_syllable10 and Avoice_syllable11 which matches each of the syllables "wa", "ter", "mel", and "ons" that make up the third word "watermelons".

Hereinafter, a method of outputting a text to a voice according to an embodiment of the present disclosure is described. The method of outputting a text to a voice according to an embodiment of the present disclosure may be a method using the system for outputting a text to a voice as described above. That is, a subject of the method of outputting a text to a voice according to an embodiment of the present disclosure may be at least one of the components of the above system.

Figure 5:
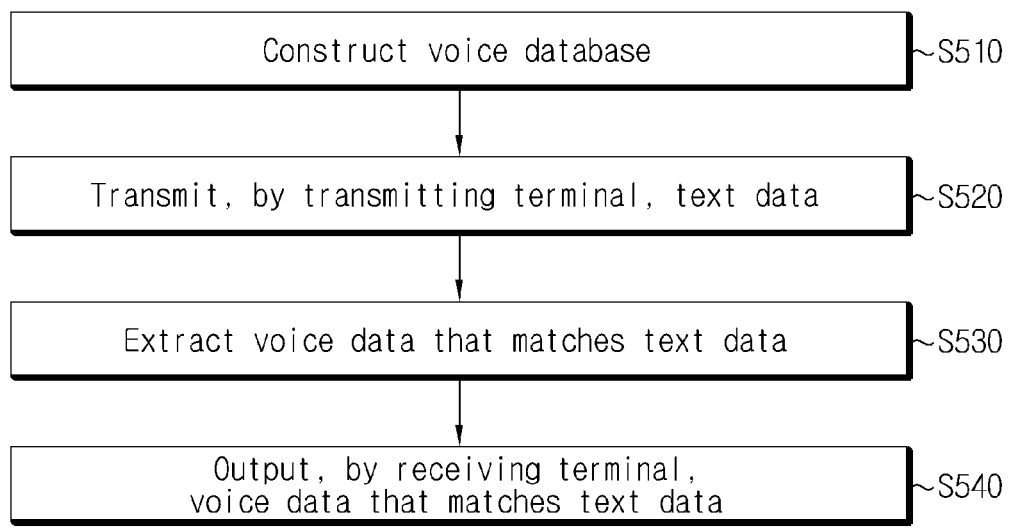
FIG. 5 is a flowchart schematically showing a method of outputting a text to a voice according to an embodiment of the present disclosure.

FIG. 5 is a flowchart schematically showing a method of outputting a text to a voice according to an embodiment of the present disclosure.

Referring to FIG. 5, the method of outputting a text to a voice according to an embodiment of the present disclosure may be performed in accordance with each step as illustrated.

First, the method begins with constructing the voice database 110 in which text data and voice data are stored in matched form for each talker (S510). Here, the voice data may be stored in matched form with text data by sentence, by word and by syllable for each talker. The voice database 110 may be constructed by various methods. Preferably, the voice database 110 may be constructed using voice data transmitted during a voice call made through the receiving terminal 20 and the transmitting terminal 10.

Subsequently, the transmitting terminal 10 transmits text data to the receiving terminal 20 (S520). In this instance, the text data transmitted from the transmitting terminal 10 may be transmitted to the receiving terminal 20 through the text server 200, and may be transmitted to the voice server 1 no through the text server 200. Subsequently, the voice server 100 conducts a search to determine whether information associated with a sender who transmitted the text data transmitted from the transmitting terminal 10 or the transmitting terminal 10 is present in the voice database 110. When information associated with the texter is present in the voice database 110, the voice server 100 extracts voice data which matches the text data from the voice database 110 (S530). Preferably, the voice server 100 searches for voice data which matches the text data in a sequential order of sentences, words, and syllables to extract voice data similar to a real talker's voice. Subsequently, the voice server 100 transmits the voice data which matches the text data to the receiving terminal 20. Subsequently, the receiving terminal 20 outputs the voice data which matches the text data through a speaker (S540). Through this, the receiving terminal 20 may output a voice corresponding to the text data as the sender's voice. Selectively, the receiving terminal 20 may not only output a text through the display but also output a voice through the speaker. In this instance, the receiving terminal 20 has a button or an icon to select whether to output a voice, and when the button is pressed or the icon is selected, the receiving terminal 20 may be configured to output a voice. Also, the receiving terminal 20 may output visual information corresponding to a grade representing a construction degree of the voice database 110 through the display, to allow a user of the receiving terminal 20 to see the construction degree of the voice database 110. The user of the receiving terminal 20 may intuitively know the construction degree of the voice database 110 through the visual information representing the construction degree of the voice database 110. Also, the user of the receiving terminal 20 may indirectly know the degree of communication via a voice call with a user of the transmitting terminal 10 through the construction degree of the voice database 110. Thus, a voice call between the user of the receiving terminal 20 and the user of the transmitting terminal 10 may be induced.

The voice information of the talker of the transmitting terminal 10 stored in organized manner by the above method may be used to convert not only the text data transmitted from the transmitting terminal 10 but also any other text data. For example, the receiving terminal 20 may output books and documents stored in the receiving terminal 20 to the voice of the talker, of the transmitting terminal 10 stored in organized manner. As another example, the receiving terminal 20 may output a music with the voice of the talker of the transmitting terminal 10 stored in organized manner. As still another example, in an application designed to answer to a question, a voice being outputted may be changed to the voice of the talker of the transmitting terminal 10 stored in organized manner. For example, an iOS application Siri's response may be converted to the voice of the talker of the transmitting terminal 10.

Through this, the user of the receiving terminal 20 feels as if he/she really makes a conversation with the talker of the transmitting terminal 10, making a communication terminal become a companion such as a pet.

On the other hand, the above method may be programmed and stored in storing media readable by computer.

Although it is described that the operations for voice conversion and data storage in organized manner are performed on the mobile communication network 30 in the above example, the present disclosure is not limited thereto. That is, the operations may be performed in the transmitting terminal 10 or the receiving terminal 20, and some may be performed on a server of the mobile communication network 30 and the others may be performed in the transmitting terminal 10 or the receiving terminal 20.

While the present disclosure has been hereinabove described by a limited number of embodiments and drawings, the present disclosure is not limited thereto and it should be understood that various changes and modifications may be made by those having ordinary skill in the art within the scope of the disclosure and the appended claims and their equivalents.

What is claimed is:

1. A method of outputting a text to a voice through a communication network, the method of outputting a text to a voice comprising:
    transmitting, by a transmitting terminal of a sender, first text data to a receiving terminal via said communications network;
    converting, by the receiving terminal, text content of the first text data transmitted from the transmitting terminal to speech using text-to-speech technologies that depends on a voice database, wherein the voice database comprises the first text data and first voice data of the sender, and the first text data corresponds to the first voice data;
    outputting the converted speech in voice characteristics of the sender,
    updating the voice database by storing second voice data of the sender and second text data corresponding to the second voice data in the voice database, the second voice data is transmitted and received during a voice call between the transmitting terminal and the receiving terminal, and
    quantitating a construction degree of the voice database constructed through the voice call between the transmitting terminal and the receiving terminal,
    wherein the quantitating comprises quantitating the construction degree of the voice database for each text data sender by summing up a number of sentences, a number of words, and a number of syllables in the first and second voice data and the first and second text data stored in the voice database for each sentence, each word, and each syllable.

2. The method according to claim 1, wherein the voice database comprises storing voice data of the sender of the first text data and text data corresponding to the second voice data for each sentence, each word, and each syllable.

3. The method according to claim 2, before the outputting the converted speech in the voice characteristics of the sender, further comprising:
    conducting a search to determine whether the sender's first voice data is present in the voice database;
    extracting, from the voice database, voice data of the sender corresponding to the first text data based on a search result of the conducting the search; and
    transmitting the voice data of the sender extracted,
    wherein the extracting voice data comprises:
    extracting, from the voice database, voice data of the sender that matches a sentence included in the first text data;
    extracting, from the voice database, voice data of the sender that matches a word included in the first text data; and
    extracting, from the voice database, voice data of the sender that matches a syllable included in the first text data.

4. The method according to claim 3, wherein the extracting the word is performed after the extracting a sentence, and when extracting voice data of the sender for a predetermined sentence is successively performed in the extracting the sentence, extracting a word for the predetermined sentence is not performed, and
    when extracting voice data of the sender for a predetermined word is successively performed in the extracting a word, extracting a syllable for the predetermined word is not performed.

5. The method according to claim 4, wherein the extracting the sentence, the extracting the word, and the extracting the syllable are iteratively performed on at least two sentences included in the text data transmitted from the transmitting terminal.

6. The method according to claim 1, wherein the voice database comprises constructing the voice database with repetition of voice calls between the transmitting terminal and the receiving terminal.

7. The method according to claim 6, wherein the voice database comprises further storing text data absent in an already constructed voice database among text data corresponding to the second voice data constituting the voice call between the transmitting terminal and the receiving terminal in matched form with voice data corresponding to the text data absent in the voice database, for each sentence, each word, and each syllable.

8. The method according to claim 7, wherein the voice database comprises updating and storing text data present in an already constructed voice database among text data corresponding to the second voice data constituting the voice call between the transmitting terminal and the receiving terminal, in matched form with voice data corresponding to text data absent in the voice database, for each sentence, each word, and each syllable.

9. The method according to claim 1, after the quantitating, further comprising:
grading the construction degree of the voice database by a predetermined grade based on a value quantitated in the quantitating.

10. The method according to claim 1, after the grading, further comprising:
outputting, by the receiving terminal, the grade graded in the grading through a display.

11. The method according to claim 10, wherein the outputting the graded grade comprises outputting different visual information based on the predetermined grade.

12. The method according to claim 1, wherein the quantitating comprises quantitating the construction degree of the voice database for each text data sender by providing each weight to a number of sentences, a number of words, and a number of syllables in the first and second voice data and the first and second text data stored in the voice database for each sentence, each word, and each syllable, and summing up the weighted number of sentences, the weighted number of words, and the weighted number of syllables.

13. The method according to claim 12, wherein the weight provided to the number of sentences is higher than or equal to the weight provided to the number of words, and the weight provided to the number of words is higher than or equal to the weight provided to the number of syllables.

14. The method according to claim 1, before the outputting the converted speech in the voice characteristics of the sender, further comprising:
conducting a search to determine whether the sender's first voice data is present in the voice database;
extracting, from the voice database, voice data corresponding to the first text data transmitted from the transmitting terminal based on a search result in the conducting the search; and
transmitting the voice data extracted to the receiving terminal.

15. The method according to claim 14, wherein the extracting voice data comprises extracting voice data of the sender that corresponds to the first text data.

16. The method according to claim 14, wherein the extracting voice data comprises extracting a robot voice stored in the voice database when information that matches information associated with the sender of the first text data is absent in the voice database as a search result in the conducting a search.

17. A system for outputting a text to a voice, comprising:
a communication network;
a transmitting terminal of a sender configured to transmit first text data to a receiving terminal via the communication network; and
a receiving terminal configured to:
convert text content of the first text data to speech using text-to-speech technologies that depends on a voice database included in a voice server, the voice database comprises the first text data and first voice data of the sender, and the first text data corresponds to the first voice data, and
output the converted speech in voice characteristics of the sender,
wherein the voice server updates the voice database by storing second voice data of the sender and second text data corresponding to the second voice data in the voice database, wherein the second voice data is transmitted and received during a voice call between the transmitting terminal and the receiving terminal,
wherein the voice server quantitates a construction degree of the voice database constructed through the voice call between the transmitting terminal and the receiving terminal, and
wherein the voice server quantitates the construction degree of the voice database for each text data sender by summing up a number of sentences, a number of words, and a number of syllables of the first and second voice data and the first and second text data stored in the voice database for each sentence, each word, and each syllable.

18. The system according to claim 17, wherein the voice server stores voice data of the sender of the first text data and text data in the voice server corresponding to the second voice data for each sentence, each word, and each syllable.

19. The system according to claim 18, wherein the voice server constructs the voice database with repetition of voice calls between the transmitting terminal and the receiving terminal.

20. The system according to claim 19, wherein the voice server further stores text data absent in an already constructed voice database among text data corresponding to the second voice data constituting the voice call between the transmitting terminal and the receiving terminal, in matched form with voice data corresponding to the text data absent in the voice database, for each sentence, each word, and each syllable.

21. The system according to claim 20, wherein the voice server updates and stores text data present in an already constructed voice database among text data corresponding to the second voice data constituting the voice call between the transmitting terminal and the receiving terminal, in matched form with voice data corresponding to text data absent in the voice database, for each sentence, each word, and each syllable.

22. The system according to claim 17, wherein the voice server grades the construction degree of the voice database into a predetermined grade based on the quantitated value.

23. The system according to claim 17, wherein the receiving terminal outputs the grade graded into the predetermined grade through a display.

24. The system according to claim 23, wherein the receiving terminal outputs different visual information based on the predetermined grade.

25. The system according to claim 17, wherein the voice server quantitates the construction degree of the voice database for each text data sender by providing each weight to a number of sentences, a number of words, and a number of syllables in the first and second voice data and the first and second text data stored in the voice database for each sentence, each word, and each syllable, and summing up the weighted number of sentences, the weighted number of words, and the weighted number of syllables.

26. The system according to claim 25, wherein the weight provided to the number of sentences is higher than or equal to the weight provided to the number of words, and the weight provided to the number of words is higher than or equal to the weight provided to the number of syllables.

27. The system according to claim 26, wherein the voice server receives the first text data transmitted from the transmitting terminal, conducts a search to determine whether information that matches information associated with the sender of the first text data is present in the voice database, extracts, from voice database, the first voice data corresponding to the first text data transmitted from the transmitting terminal based on a result of the conducting the search, and transmits the extracted voice data to the receiving terminal, and in the extracting, from the voice database, first voice data corresponding to the first text data transmitted from the transmitting terminal based on a result of the conducting the search, the voice server searches for a text content included in the first text data transmitted from the transmitting terminal in the voice database, and extracts at least one of voice data that matches a sentence corresponding to a sentence included in the first text data transmitted from the transmitting terminal, voice data that matches a word corresponding to a word included in the first text data transmitted from the transmitting terminal, and voice data that matches a syllable corresponding to a syllable included in the first text data transmitted from the transmitting terminal.

28. The system according to claim 27, wherein when voice data that matches a sentence corresponding to a predetermined sentence included in the first text data transmitted from the transmitting terminal is present in the voice database, the voice server extracts only voice data that matches the sentence corresponding to the predetermined sentence, and when voice data that matches a word corresponding to a predetermined word included in the first text data transmitted from the transmitting terminal is present in the voice database, the voice server extracts only voice data that matches the word corresponding to the predetermined word.

29. The system according to claim 28, wherein the voice server performs voice data extraction on at least two sentences included in the text data transmitted from the transmitting terminal.

30. The system according to claim 17, wherein the voice server receives the first text data transmitted from the transmitting terminal, conducts a search to determine whether information that matches information associated with the sender of the first text data is present in the voice database, extracts, from the voice database, the first voice data corresponding to the first text data transmitted from the transmitting terminal based on a result of the conducting a search, and transmits the extracted voice data to the receiving terminal.

31. The system according to claim 30, wherein the voice server extracts voice data of the sender of the first text data stored in the voice database when information that matches information associated with the sender of the first text data is present in the voice database as a result of the conducting the search.

32. The system according to claim 30, wherein the voice server extracts a robot voice stored in the voice database when information that matches information associated with the sender of the first text data is absent in the voice database as a result of the conducting the search.

* * * * *